UNITED STATES PATENT OFFICE.

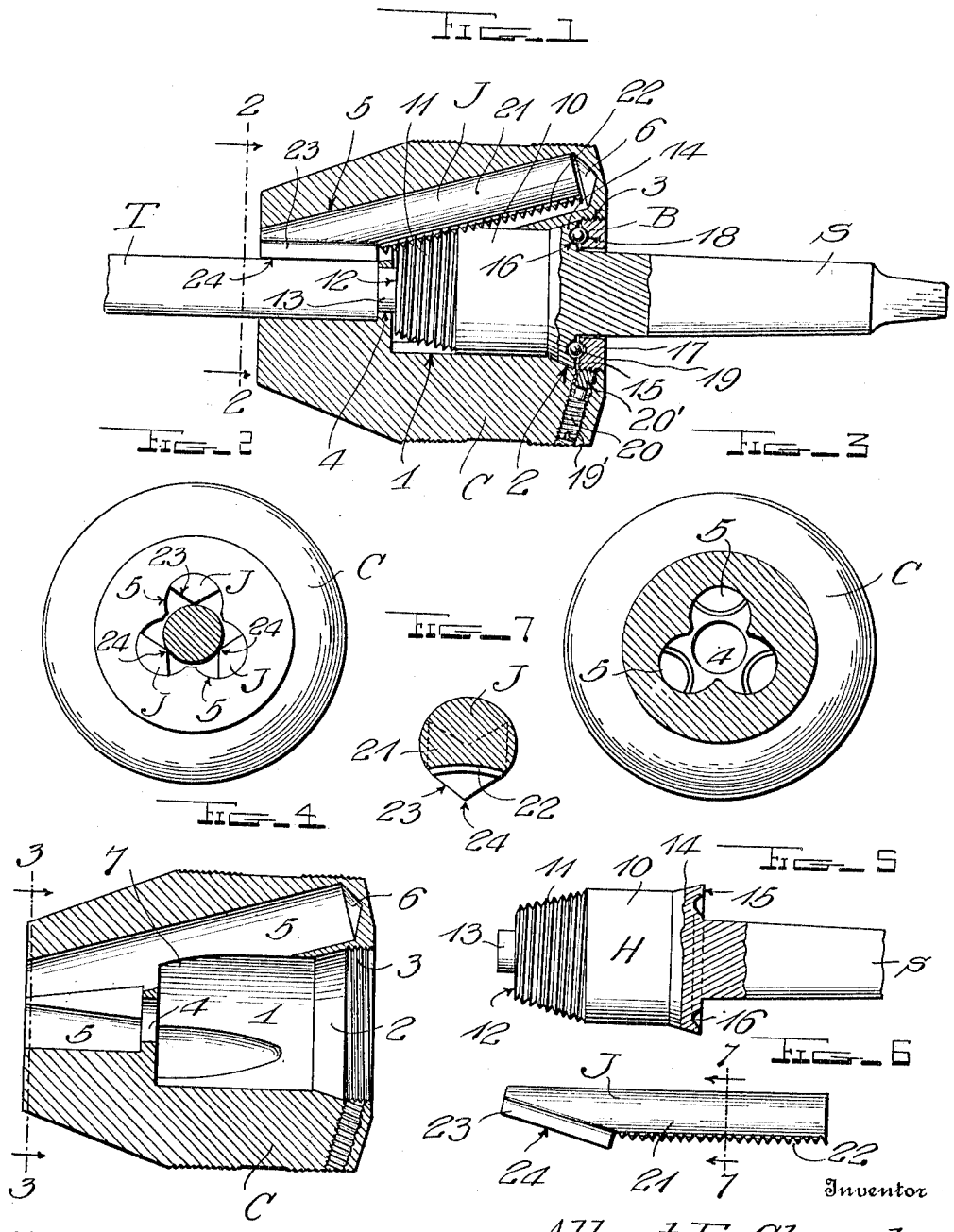

ALBERT E. CHURCH, OF NEW BRITAIN, CONNECTICUT.

CHUCK.

1,106,189.   Specification of Letters Patent.   Patented Aug. 4, 1914.

Application filed October 16, 1913. Serial No. 795,546.

*To all whom it may concern:*

Be it known that I, ALBERT E. CHURCH, a citizen of the United States, residing at New Britain, in the county of Hartford and State of Connecticut, have invented certain new and useful Improvements in Chucks; and I do declare the following to be a full, clear, and exact description of the invention, such as will enable others skilled in the art to which it appertains to make and use the same.

This invention relates to machine chucks and tool sockets, and more especially to bevel-closing chucks having a rotating ring and advancing jaws; and the object of the same is to improve a chuck of this type.

To this end the invention consists in the details set forth in the following specification and claim, and shown in the drawings wherein—

Figure 1 is a central longitudinal sectional view through this chuck, showing a tool as held therein; and Fig. 2 is a front elevation of this chuck, giving a cross section of the tool-shank on the line 2—2 of Fig. 1; Fig. 3 is a cross section on the line 3—3 of Fig. 4; and Fig. 4 is a central longitudinal section of the collar alone; Fig. 5 is a side elevation, partly in section, of the head. Fig. 6 is a side elevation of one of the jaws; and Fig. 7 is a cross section on the line 7—7 of Fig. 6.

This chuck comprises a shank S having a head H swivelly mounted within a collar C and held therein by an adjustable ball bearing B, and the rotation of said head within the collar causes the advance or recession of a plurality of jaws J whose active faces engage the shank of the tool T. The latter may be a drill or any other form of tool, as it is obvious that the use of this invention is not necessarily limited. The shape of the shank S is such as will permit the chuck to be carried by any suitable driving mechanism which could be actuated by hand or by power, and therefore I do not wish to be limited in this respect. Nor are the exact sizes, shapes, materials and proportions of parts essential to the successful operation of the invention. While I have described the ball bearing B with considerable minuteness hereinafter, that also is susceptible of change.

Coming now to the details as illustrated in the drawings, the collar C has a large internal cylindrical cavity 1 whose rear end flares slightly as at 2, and is internally threaded as at 3 where it opens out the rear end of the block constituting this collar. The front end of the cavity communicates by means of an opening 4 with the forward portion of three or more converging channels 5 which intersect each other forward of said hole and produce an opening into which the tool T is inserted, but the rear ends 6 of said channels do not open through the rear end of the collar C. At about their midlength these channels intersect the forward portion of the cavity 1 as shown at 7.

The head H has a cylindrical body portion 10, forward of which it is tapered and threaded as at 11, its front end 12 being flat excepting for a reduced axial projection 13 which rotates within the opening 4. Rearward of the cylindrical body portion 10 the head is enlarged and slightly flared as at 14, and the rear end of the head around the shank S is flat as at 15 except for an annular groove 16 which in the present instance forms one channel or ball race for the ball bearing B. The other member of said bearing is herein shown as a nut 17 adapted to be engaged with the threads 3, and this nut has the complementary channel or ball race 18 therein between which and the groove 16 travel the balls 19.

The collar C is also provided with a transverse threaded channel 19' which terminates at its inner end in the threaded wall of the cavity and insertible in this channel is a plug 20' which has threads on its inner face adapted to engage the externally threaded periphery of said collar 17. Engaged with this threaded channel 19' is a set screw 20 which when turned home will engage the plug 20' as clearly disclosed in Fig. 1 of the drawings to force the latter against the threaded periphery of the collar 17, thus securing the latter in place and also positively retaining the head member in position in the cavity. The flat front end 12 of the head is normally out of contact with the front wall of the cavity 1 so as to permit adjustment of this nut, and such adjustment obviously takes up for the wear of parts and forces the beveled or flaring portion 14 forward within the beveled or flaring portion 2 of the cavity 1.

The jaws J are alike, and a description of one will suffice for all. There may be three as shown, or there might be more than three but hardly less. Each is formed with a substantially cylindrical body 21 having one side cut away throughout most of the length of the body on a curve and threaded as at 22 to engage the threads 11 on the head H, and the size of the body to and including the outermost portion of said threads is such that the jaw may move freely within the channel 5 in the collar C. The front end of the jaw is formed with an inclined biting face 23 which stands at a slight angle to the longitudinal axis of the jaw, and this face itself is by preference cut on a transverse obtuse angle whereof the numeral 24 designates the apex. The angularity of the face to the axis is about the same as the angularity of the channels 5 to the axis of the head, and the result is that the biting faces or the transverse angles 24 of all the jaws will maintain parallelism with the axis of the collar C no matter what the position of said jaws.

With the parts thus constructed, the collar C constitutes a hand-piece rotating around the head H on the forward end of the shank S. Turning this collar in one direction retracts the jaws and spreads their biting faces apart. The tool T is then inserted and held in place while the collar C is turned in the other direction until the biting faces come in contact with it. The shank S is then inserted in the stock or connected with whatever driving mechanism is employed, and when the same is rotated in the proper direction it carries all parts with it including the tool T, and resistance to the rotation of the tool which would result in a tendency for the collar C to cease its rotation, only causes the turning of said collar still slightly farther around the head and therefore an increased tension of the biting faces of the jaws on the tool. To release the latter the rotation is stopped, and the collar turned in the other direction.

What is claimed as new is:

A chuck of the class described comprising a collar having a cavity therein extending from one end of the same and terminating at a point adjacent the opposite end thereof, said collar being provided with a plurality of forwardly converging channels intersecting said cavity midway of the ends of the same and also intersecting one another at their forward ends to form a socket at the forward end of said collar, said channels terminating at their rear ends slightly in advance of the rear face of said collar and radially beyond the wall of said cavity therein to provide closed rear ends for said channels, a head member revolubly mounted in said cavity and provided with a tapered threaded portion, a plurality of elongated jaw members longitudinally movable in said channels and having their inner opposed faces provided with threads for engagement with the tapered threaded portion of said head member, a shank on said head member and projecting rearwardly therefrom through the rear end opening of said cavity and means in connection with the rear end opening of said cavity and a portion of said head member to retain the latter in its operative position in the collar.

In testimony whereof I have hereunto set my hand in presence of two subscribing witnesses.

ALBERT E. CHURCH.

Witnesses:
 CARL S. MUELLER,
 GEORGE H. INGRAHAM.

Copies of this patent may be obtained for five cents each, by addressing the "Commissioner of Patents, Washington, D. C."